Aug. 20, 1957 LA VERNE F. BENTZEN 2,803,739
WELDING MACHINE
Filed Aug. 23, 1954 7 Sheets-Sheet 6
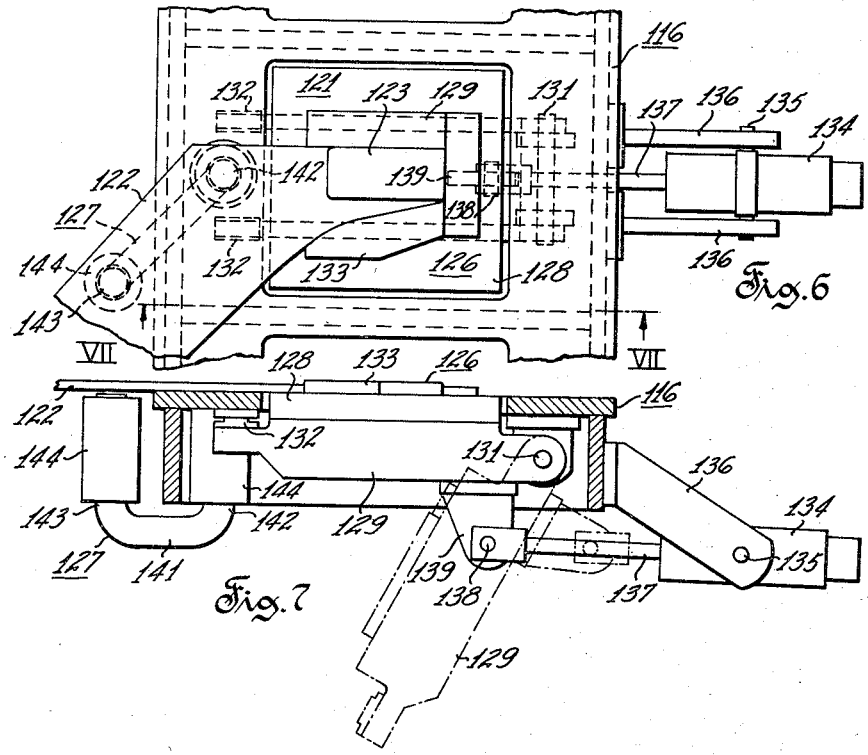
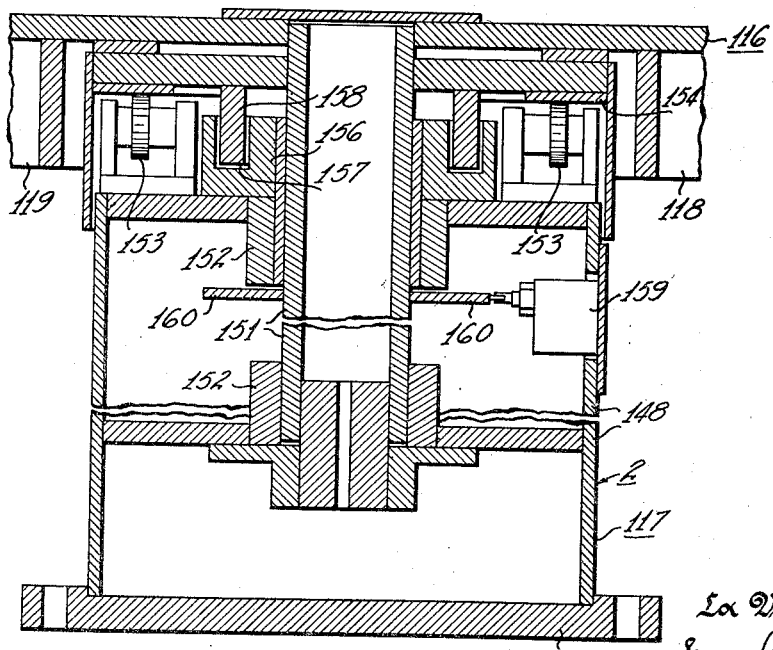
Inventor
La Verne F. Bentzen

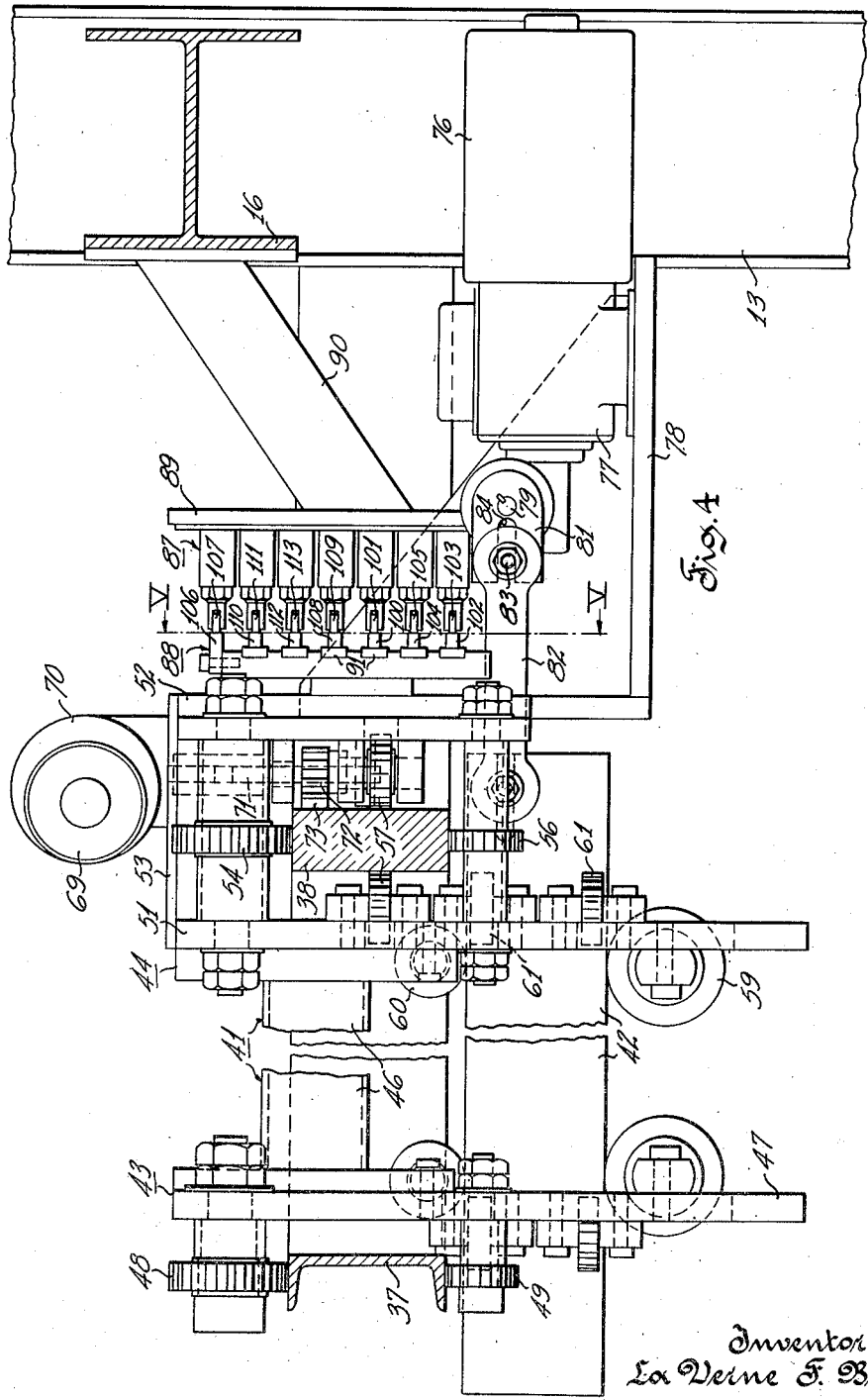

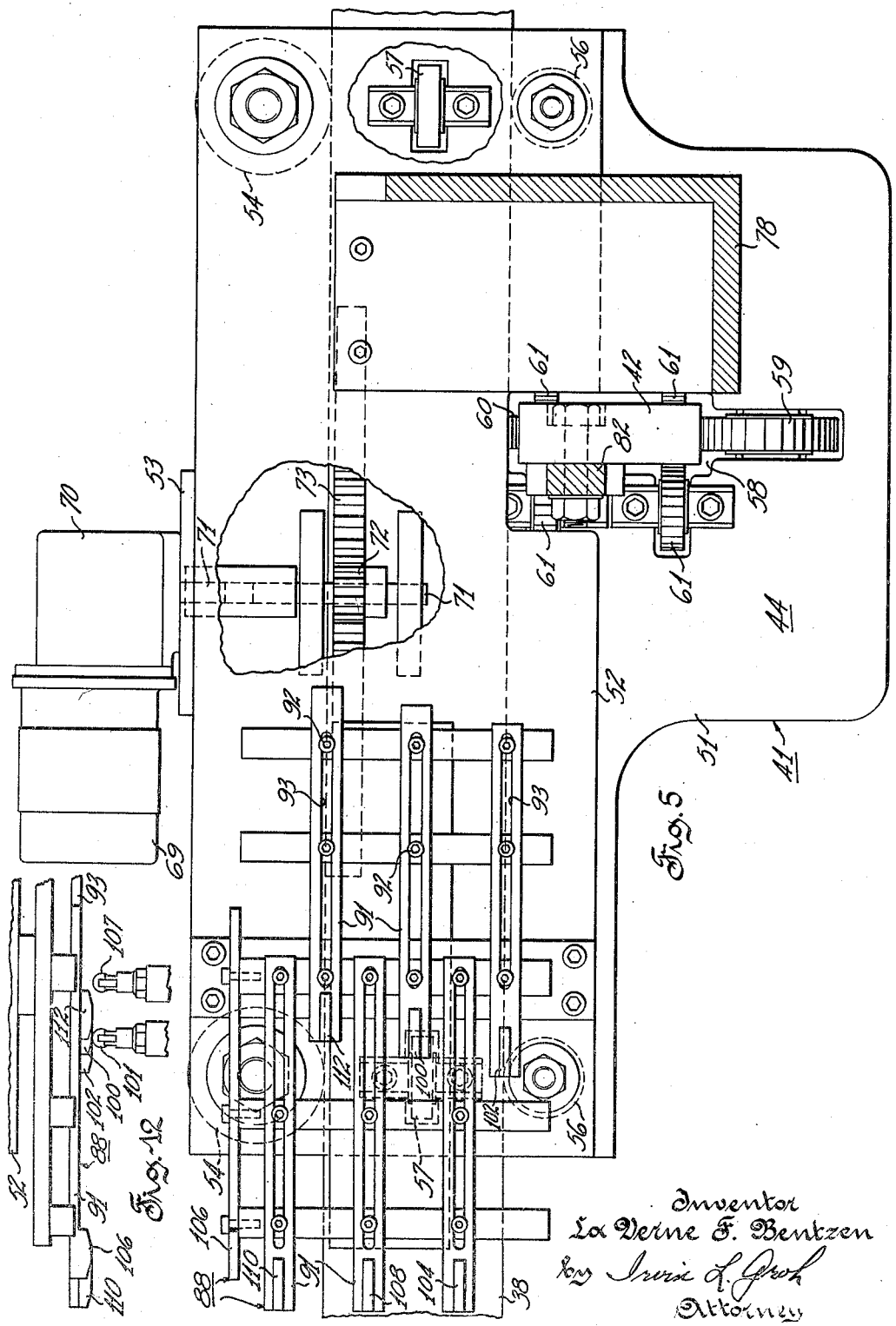

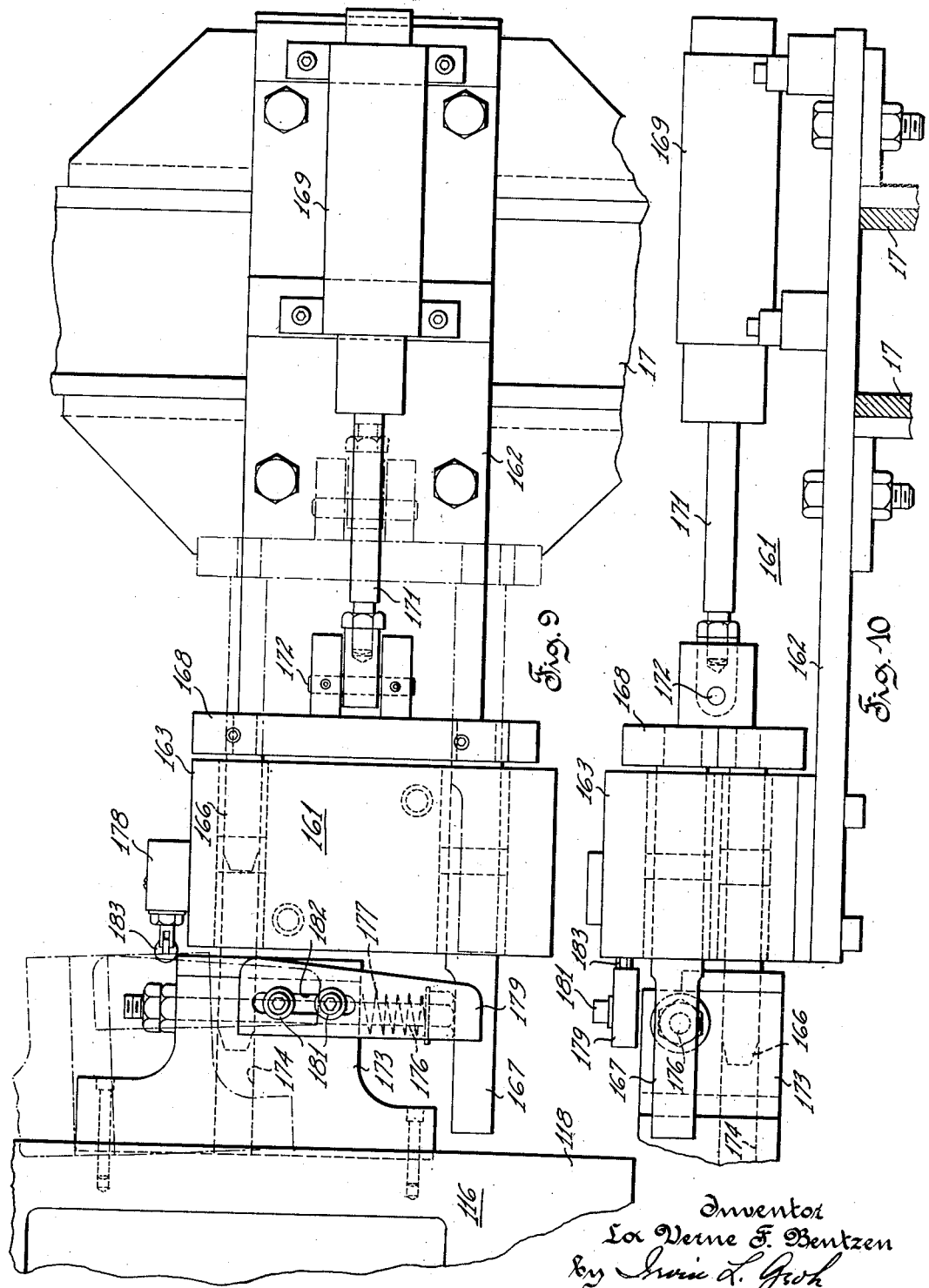

United States Patent Office 2,803,739
Patented Aug. 20, 1957

2,803,739

WELDING MACHINE

La Verne F. Bentzen, La Crosse, Wis., assignor to Allis-Chalmers Manufacturing Company, Milwaukee, Wis.

Application August 23, 1954, Serial No. 451,363

3 Claims. (Cl. 219—130)

This invention relates to arc welding machines, and it is concerned more particularly with an arc welding machine for facing the surface of a workpiece with a weldment.

In facing workpieces, for instances plowshares, with a weldment it is necessary that the depth of penetration of the weld be the same in each workpiece and that all weldments are of the same size, that is, of the same length and width so that the quality and dimensions of the resulting product are uniform. When weldments of this type are to be applied by means of a machine it is particularly desirable that identical weldments may be formed simultaneously on all the workpieces, rather than resorting to the use of a separate machine for each workpiece. Separate machines require a duplication of equipment and require a number of operators, with consequent high costs of equipment and labor.

It is also desirable that a welding machine of the outlined character be operable for substantially continuous production, that is, without long interruptions to unload welded workpieces and to load unwelded workpieces to the machine.

Generally, it is an object of this invention to provide an arc welding machine which will take care of the hereinabove outlined requirements in a practical and entirely satisfactory manner, and which lends itself for use in applying a weldment of predetermined length and width to the surface of a workpiece, particularly a plowshare.

Another object of this invention is to provide an improved arc welding machine which is adapted for mass production purposes and with which identical weldments may be applied simultaneously to a plurality of workpieces.

It is still another object of this invention to provide an arc welding machine for forming a weldment of predetermined length and width on the surface of a workpiece in which the welding apparatus for forming the electric arc is interrupted for a minimum length of time during the loading and unloading of workpieces to and from the welding machine.

It is another object of this invention to provide a welding machine in which movement of machine parts during the welding cycle controls the feeding of weld metal and weld flux to the welding area of the workpiece.

Another object of this invention is to provide an improved multiple head arc welding machine in which the welding heads automatically return to a position for starting a new weld during the unloading operation of the machine by an operator.

The foregoing and other objects and advantages are obtained by the present invention, various novel features of which will be apparent from the description herein and the accompanying drawings disclosing an embodiment of the invention, and will be more particularly pointed out in the appended claims.

Referring to the drawings:

Fig. 4 is an enlarged front view of part of the machine shown in Fig. 1 with parts in section and others omitted for purposes of exposure;

Fig. 5 is a section taken on line V—V in Fig. 4;

Fig. 6 is an enlarged plan view of one of the workpiece mounting stations shown in Fig. 3 with a part of a plow-share blank shown in welding position;

Fig. 7 is a section on line VII—VII in Fig. 6;

Fig. 8 is an enlarged sectional view of a portion of the welding table shown in Fig. 1;

Fig. 9 is an enlarged plan view of the table locking mechanism shown in Fig. 3;

Fig. 10 is a front elevation of the table lock shown in Fig. 9;

Fig. 11 is an enlarged detail view of a flux control valve incorporated in the machine shown in Figs. 1 and 2; and Fig. 12 is a top view of the electrical control means shown in Fig. 4.

Figure 1:
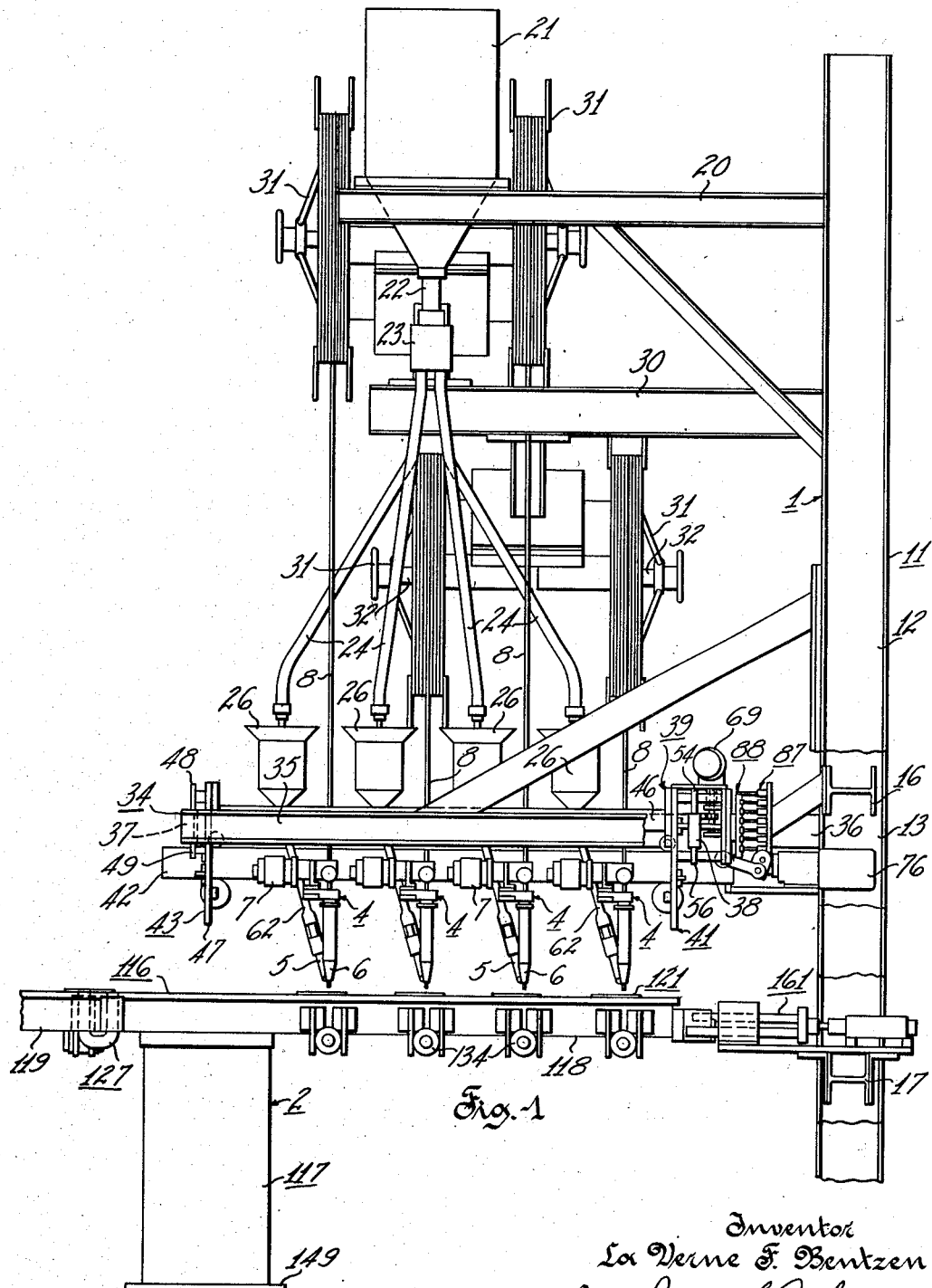
Fig. 1 is a front elevation of a multiple head arc welding machine.
Figure 2:
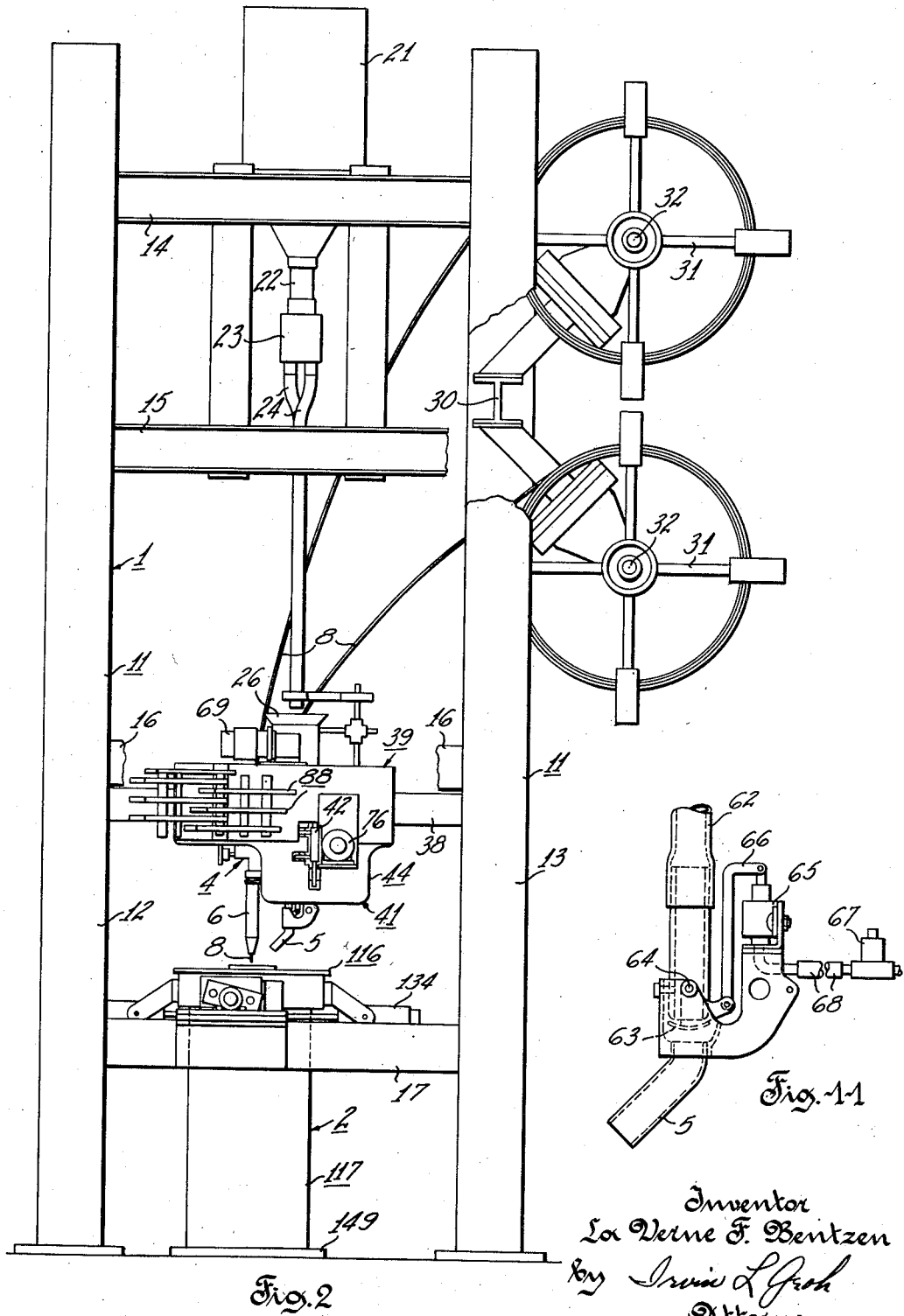
Fig. 2 is a side elevation of the machine shown in Fig. 1.

Referring to Figs. 1 and 2, the welding machine comprises a support structure 1 on which is mounted the welding apparatus used to form weldments on a plurality of workpieces, and a table 2 which is used to support the workpieces to which the weldments are applied.

The welding apparatus is of the type used in submerged arc welding and includes four conventional welding heads 4 and flux spouts 5. Each welding head 4 includes the usual rod holder 6 and a motor 7 which actuates a mechanism for feeding welding rod 8 through the holder 6 to the welding arc. The welding arc is formed between the end of the rod 8 and the workpiece to be welded so that the welding rod forms a fusible electrode which is melted by the arc. One flux spout 5 is connected to each welding head 4 in position to deposit a blanket of flux on the workpiece to submerge the end of the welding rod so that the welding arc is formed within the layer of flux.

The support structure 1 on which the welding apparatus is mounted, includes a vertical main frame 11 rigidly mounted on the floor. The main frame 11 comprises a pair of vertical I-beams 12 and 13 rigidly connected together in parallel spaced relation by means of horizontal beams 14, 15, 16 and 17.

A cantilever subframe 20 is rigidly connected at one of its ends to the top portion of the vertical main frame 11 and extends horizontally therefrom to support a flux storage bin 21. The flux storage bin 21 is provided with a valve (not shown) which is used to open and close the tube 22 to permit flux to flow from the storage bin 21 through a manifold 23 for distribution to tubes 24 which in turn convey the flux to hoppers 26, one of which is associated with each welding head 4.

A cantilever beam 30 is connected at one end to the I-beam 13 of the vertical main frame 11 and extends horizontally and generally below the bin supporting frame 20. Cantilever beam 30 supports four conventional welding rod reels 31 which are rotaably mounted on axles 32 in general alignment with the welding heads 4. The welding reels 31 are used for storing welding rod or wire 8 and during welding the motors 7 of the welding heads 4 actuate a feed mechanism to unwind welding rod 8 from the reels 31 and to feed it to the arc formed by the associated welding head 4.

Figure 3:
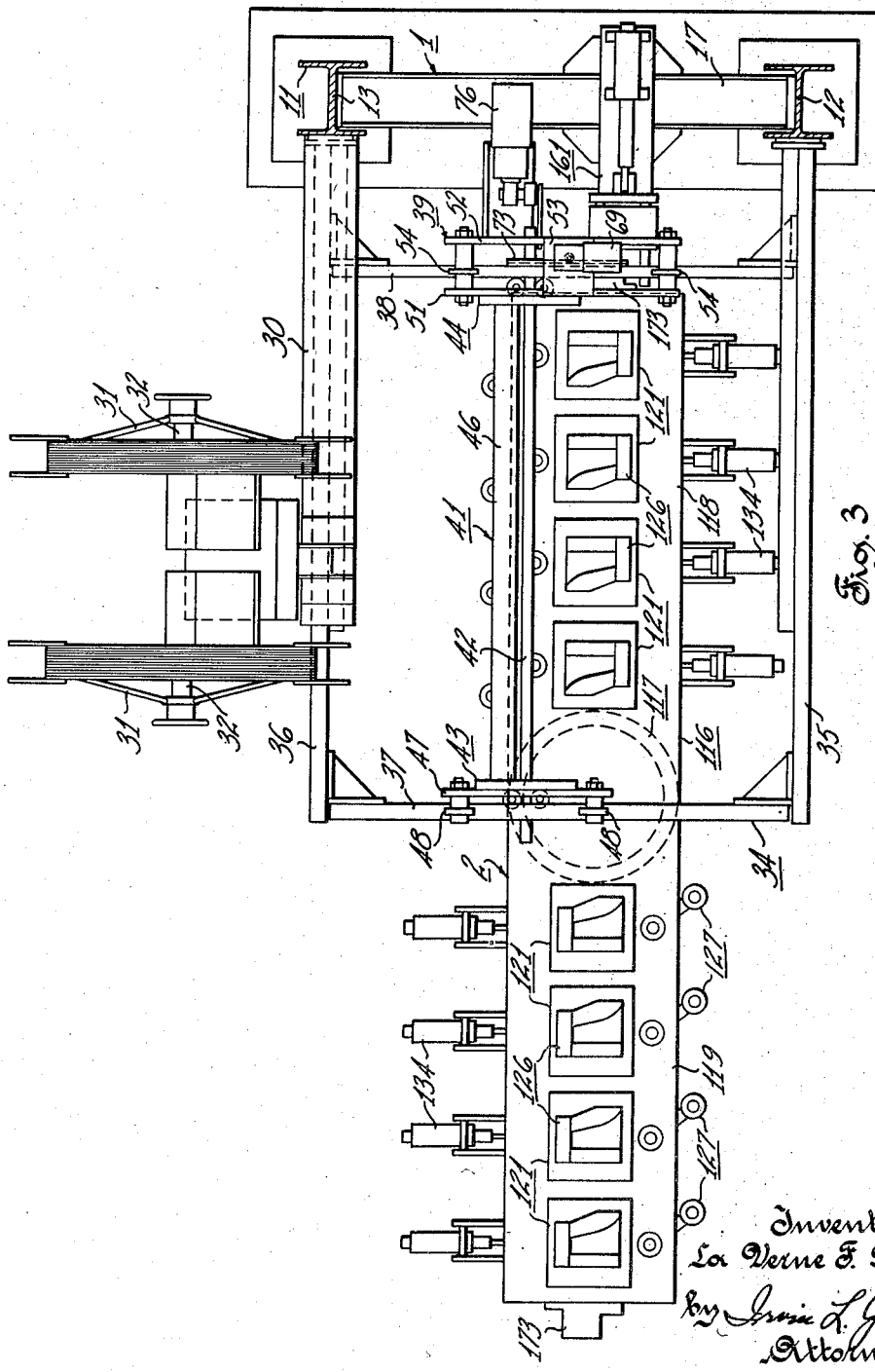
Fig. 3 is a top view of the welding machine shown in Fig. 1 with parts broken away and removed for purposes of exposure.

Referring now to Figs. 1 and 3, a cantilever frame 34 is supported on the vertical main frame 11 and comprises a pair of parallel beams 35 and 36 rigidly connected at one end to the I-beams 12 and 13, respectively, and joined together by parallel spaced track members 37 and 38. The cantilever frame 34 forms a support for a dual feed mechanism 39 which supports and moves all of the welding heads 4 and flux spouts 5 simultaneously relative to the associated workpieces on the welding table 2 during the welding operation.

As best seen in Fig. 3, the dual feed mechanism 39 for supporting the welding heads 4 includes a carrier 41 which moves in a straight line horizontally on the tracks 37 and 38 and a traverse 42 which is supported on the carrier 41 for horizontal sliding movement relative thereto transversely of the direction of carrier movement.

The carrier 41 comprises a pair of carriages 43 and 44 which travel on the tracks 37 and 38, respectively, and support a carrier beam 46 therebetween on which the flux hoppers 26 are mounted (see Fig. 1). Referring now to Figs. 3 and 4, the carriage 43 of the carrier 41 comprises a roller plate 47 on which is mounted a pair of longitudinally spaced upper rollers 48. Rollers 48 are rotatably mounted to engage the top surface of the track 37. A second pair of rollers 49, only one of which is shown in Fig. 4, is mounted on roller plate 47 below rollers 48 to engage the underside of the track 37. The upper rollers 48 support the weight of the outer end of the carrier 41 and the lower rollers 49 prevent the carrier 41 from raising upwardly from the track 37.

The carriage 44 which supports the opposite end of the carrier beam 46 of the carrier 41 comprises a pair of parallel plates 51 and 52 positioned on opposite sides of the track 38 and rigidly connected together by a horizontal plate 53. A pair of upper rollers 54 and a pair of lower rollers 56 are rotatably mounted between the plates 51 and 52 and engage, respectively, the top and bottom surfaces of the track 38. A pair of rollers 57 is mounted on the plate 52 so that the rollers 57 rotate in a horizontal plane and engage one side of the track 38. Another pair of rollers 57 is mounted on plate 51 so that the rollers 57 engage the opposite side of the track 38. The four rollers 57 act to prevent displacement of the carrier 41 and keep the rollers 48, 49, 54 and 56 in engagement with the tracks 37 and 38.

The carrier 41 supports a traverse 42 for horizontal reciprocal movement relative to the carrier 41 transversely of the tracks 37 and 38. Traverse 42 is supported at its opposite ends on the carriages 43 and 44, respectively, of the carrier 41. Since both ends of the traverse are supported on the carrier 41 in a similar manner, only the traverse support on the carriage 44 will be referred to in detail.

Referring to Fig. 5, the end plate 51 of the carriage 44 is provided with an aperture 58 which permits the traverse 42 to extend through the end plate 51. The end of the traverse 42 is supported in the aperture 58 by a pair of rollers 59 and 60 rotatably mounted on the end plate 51 to engage the bottom and top surfaces, respectively, of the traverse 42. Two pairs of rollers 61 are rotatably mounted on the plate 51 with one pair of rollers 61 disposed adjacent one side of aperture 58 to engage one side of the traverse 42 and the other pair of rollers 61 is mounted at the opposite side of the aperture 58 to engage the other side surface of the traverse 42. Rollers 59, 60 and 61 position one end of traverse 42 for movement in the aperture 58 and similar rollers support the opposite end of the traverse 42 for movement in another aperture in roller plate 47 of carriage 43.

Referring now to Figs. 1 and 2, the dual feed mechanism 39 includes a carrier 41 on which flux hoppers 26 are rigidly mounted, and a traverse 42 on which are mounted equally spaced welding heads 4 and flux spouts 5. The hoppers 26 are connected to the flux spouts 5 by means of flexible tubes 62 to convey flux from the hoppers 26 to the welding zones on the workpieces.

Referring now to Fig. 11, each flux spout 5 is provided with a gate valve 63 positioned in the flux spout 5 to pivot about the axis of pin 64 to open or to close the spout 5. Pivotal movement of gate valve 63 to open or close the spout 5 is accomplished by means of an air servomotor 65 which is connected by a link 66 to the gate valve 63. Supply of air to the servomotors 65 is controlled by a conventional solenoid valve 67 positioned in the air supply line 68. When electric current is supplied to the solenoid valve 67 it becomes energized and the air supply line 68 is opened thereby extending the air servomotor 65 to swing the gate valve 63 to an open position. When the electric circuit is broken, the solenoid valve 67 is deenergized and the air supply line 68 is closed so that the servomotor 65 contracts and the gate valve 63 swings to a closed position. All of the solenoid valves 67 are energized and deenergized by a control switch in the electric circuit to the solenoid valves 67. Actuation of the control switch will be described more completely hereinafter.

Referring now to Figs. 4 and 5, the drive means for moving the carrier 41 on the tracks 37 and 38 comprises a reversible motor 69 mounted on the support plate 53 of the carriage 44. The motor 69 is provided with an adjustable speed reducing unit 70 having a vertical drive shaft 71. A pinion 72 is fixed on the drive shaft 71 to turn therewith and to mesh with the teeth in a rack 73 which extends longitudinally of the track 34 and is rigidly connected at one side thereof. Rotation of the motor 69 turns the pinion 72 so that it moves along the rack 73 to move carrier 41 on the tracks 37 and 38 in a direction determined by the direction of rotation of the motor 69.

As shown in Figs. 3 and 4, the traverse 42 is moved relative to the carrier 41 by means of a motor 76 and a variable speed transmission 77 which are mounted on a bracket 78 rigidly connected to the carriage 44. The transmission 77 is provided with a drive shaft 79 mounting a crank arm 81. The free end of the crank arm 81 is connected to the traverse 42 by means of a pitman 82 so that rotation of the motor 76 causes the traverse 42 to reciprocate on the carrier 41. The crank arm 81 is provided with a connecting pin 83 which may be rigidly secured to the arm 81 in any adjusted position in the slot 84. Crank pin 83 may therefore be secured at a selected distance from the drive shaft 79 to vary the crank throw and therefore the length of the path in which the traverse 42 reciprocates.

As viewed in Fig. 3, simultaneous rotation of the carrier drive motor 69 and the traverse drive motor 76 causes the carrier 41 and the traverse 42 to move together transversely of the table 2 and at the same time traverse 42 reciprocates on the carrier 41 in a direction longitudinally of the table 2. Since the traverse 42 supports the welding heads 4, simultaneous rotation of motors 69 and 76 causes the welding heads 4 to move both crosswise and lengthwise in a zigzag path and to form a welding bead on a workpiece positioned on the table 2. This results in a weldment having a predetermined length depending on the distance the carrier moves longitudinally of the tracks 37 and 38 and a predetermined width depending on the length of the stroke of the crank arm 81.

Movement of the carrier 41 longitudinally of the tracks 37 and 38 is utilized to control the operation of the rod feed motors 7 on the welding heads 4, the flow of flux from the hoppers 26 and the distances traveled by the carrier 41. This is accomplished by mounting a group of control switches 87 on the support structure 1 and a group of complementary cam members 88 on the carriage 44 so that the cam members actuate the switches in the desired sequence.

As seen in Figs. 4 and 12, a control panel 89 is rigidly connected to a bracket 90 extending from the horizontal beam 16 and the control switches 87 are mounted on the panel 89 in two vertical rows and in separate horizontal planes. As best seen in Figs. 5 and 12, each cam member 88 includes a cam bar 91 adjustably connected to the plate 52 of the carriage 44 by means of studs 92 extending through elongated slots 93 in the cam bar and threaded into stud receiving openings in plate 52. Cam bars 91 may be adjusted separately by means of studs 92 and slots 93 to position the cam bars 91 in the desired relation to the switches 87. All of the switches 87 are provided with identical rollers and all of the cam bars 91 are provided with identical cams so that each cam engages one of the rollers during movement of the carrier 41 to actuate the switches 87. The cams and the rollers will be specifically identified hereinafter.

To start the welding cycle, the motors 69 and 76 are actuated to reciprocate the traverse 42 and to move the carrier 41 to the right as viewed in Figs. 2 and 5. Referring now to Figs. 4, 5 and 12, as the carrier 41 moves, a cam 100 on the carrier 41 engages a roller 101 on one of the switches 87 to simultaneously actuate all of the solenoid valves 67 controlling supply of air to the servomotors 65 on the flux gates 63. This permits the flux to flow through the spouts 5 to the welding zone on the workpieces. Continued movement of the carrier 41 causes cam 102 to engage roller 103 thereby closing the welding circuits and also the electric circuits to the rod feed motors 7. This brings about the forming of arcs between the ends of the welding rods 8 and the associated workpieces and also the feeding of welding rods 8 to the arcs where the welding rods are continuously melted and fused with the workpieces.

As the carrier 41 continues to move during the welding operation, the welding heads 4 approach the end of the weld and the cam 104 engages the roller 105 to actuate a switch 87 thereby breaking the circuits to the rod feed motors 7. This stops feeding movement of the rods 8 to the welding zone so that the latter burn off or in other words the gaps between the ends of the rods 8 and the workpieces become so large that the welding arcs cannot be maintained. After the welding arcs fail, cam 106 engages roller 107 on one of the switches 87 to open the welding circuits. Cam 108 then engages roller 109 to break the circuits to the solenoid valves 67 causing servomotors 65 to close the flux spouts 5 thereby preventing further flux flow. At the same time cam 110 engages roller 111 to simultaneously interrupt the electrical circuits to the motors 69 and 76 thereby stopping further movement of the carrier 41 and the traverse 42.

To summarzie, after the carrier begins moving to the right as viewed in Fig. 2, flux flow starts, then rod feed begins and a welding arc is formed. After the weld is near completion, rod feed stops and then welding current, flux flow and carrier movement stop.

After the carrier 41 stops at the end of the weld, it must be returned to its original position so that a new weld may be started. To do this, motor 69 is actuated to rotate in a direction opposite to its direction of rotation during deposit of the welds, thereby moving carrier 41 to the left as viewed in Fig. 2. As the carrier 41 reaches its starting position, cam 112 engages roller 113 on one of the switches 87 to break the electrical circuit to the motor 69 and to end return travel of the carrier 41 on the tracks 37 and 38. Actuation of the motor 69 to return the carrier 41 to its starting position is accomplished by manipulation of the table 2 in a manner to be described hereinafter.

It can now be seen that the movement of the carrier 41 determines the length of the weldment formed by the welding heads 4 and that the reciprocating stroke of the traverse 42 determines the width of the weldment. To adjust the width of the weldment, the position of the crankpin 83 is adjusted radially of drive shaft 79. To adjust the length of the weldment, the weld starting position may be selected by adjusting cam bars 91 to place cams 100, 102 and 112 in a new position on the carriage 44 of carrier 41 and the weld ending position can be selected by changing the position of cams 104, 106, 108 and 110.

Referring now to Figs. 1 and 3, the table 2 which supports the workpieces in a welding position below the welding heads 4 on the support 1, comprises an elongated table top 116 rotatably supported on a table post 117 so that either table end 118 or table end 119 can be positioned below the welding heads 4. Table end 119 is provided with a group of four workpiece mounting stations 121 which are spaced apart equal distances to correspond to the spacing of the welding heads 4 on the traverse 42, the entire group of stations 121 being spaced radially from the vertical axis of the table post 117. Another group of stations 121 is radially spaced a like amount from the axis of post 117 on the table end 118.

As best seen in Figs. 6 and 7, all of the workpiece mounting stations 121 are identical so that only one will be referred to in detail. Station 121 is adapted to secure a flat plowshare blank 122 in position so that a weldment 123 may be formed on the point portion to thicken the latter and to add wear resistant metal for the purpose of forming a thick wear resistant plowshare point. Station 121 comprises a positioning fixture 126 and an electromagnet 127 for securing the blank 122 in a welding position.

The fixture 126 comprises a rectangular plate member 128 having a pair of hinge members 129 rigidly connected to the underside thereof and pivotally mounted for up and down swinging movement about the axis of a hinge pin 131 secured to the table top 116. The free ends of the hinge members 129 are provided with adjustable stops 132 which engage the underside of the table top 116 and make it possible to level the plate member 128 relative to the top surface of table 2. The top surface of the plate member 128 is provided with a jig 133 which may be fixed to plate member 128 to properly index the workpiece relative to the table top 116. Plate member 128 is held level with the table top 116 and is swung downwardly to dump unused flux which acumulates on the plate member 128 by means of a double acting air ram 134 pivotally mounted by pins 135 to brackets 136 on the table top 116. The piston rod 137 of the ram 134 is pivotally connected by means of a pin 138 to a bracket 139 at the underside of the fixture plate 128. When the air ram 134 is extended, the fixture plate 128 will pivot upwardly about the axis of hinge pin 131 until the stops 132 engage the underside of the table top 116. When the air ram 134 is collapsed, the plate member 128 will swing downwardly about the axis of hinge pin 131 to the dot-dash line position shown in Fig. 7 to permit unused flux remaining on the fixture plate 128 to spill into a container (not shown) below the table.

The electromagnet 127 comprises a U-shaped core 141 having one leg 142 secured in an aperture in the table top 116 and the other leg 143 positioned at the side of the table so that the ends of the legs 142 and 143 are substantially flush with the surface of the table top 116. A pair of coils 144 surround the legs 142 and 143, respectively, of the core 141 and these are connected to a current source which may be actuated and interrupted in any conventional manner so that a magnetic field may be provided for securing the plowshare blank 122 on the table top 116 after it has been indexed by jig 133 in its proper position relative to the table top 116.

The table top 116 and the stations 121 are swingable as a unit on the supporting post 117 shown in Fig. 8 which comprises a support tube 148 having a plate 149 secured to the lower end thereof. The plate 149 may be rigidly secured to the floor to fix its position relative to the support structure 1. A tubular shaft 151 is rigidly secured to the table top 116 and is positioned in the support by bearing mountings 152 to turn about the vertical axis of support tube 148. The weight of the table top 116 is supported on a plurality of rollers 153 spaced circumferentially of and rotatably mounted on support tube 148 to engage a circular track 154 rigidly mounted on the table top 116. A grooved ring 156 is rigidly mounted on the support tube 148 to surround the tubular shaft 151 and is provided with a groove 157. The groove 157 is filled with mercury and a contact ring 158 is rigidly mounted on the table top 116 and partially immersed in the mercury to complete the welding circuits between the welding heads 4 and the support tube 148.

An electrical switch 159 is mounted on the table support tube 148 and a pair of complementary cam members 160 is rigidly mounted on the tubular shaft 151 so that cams 160 extend in opposite directions to turn with table top 116 and to engage the switch 159. When one of the cams 160 engages the switch 159, an electric circuit is completed to the carrier drive motor 69 causing it to rotate in a direction for returning the carrier 41 to the position which it ordinarily occupies at the beginning of the weld. The cams 160 are associated with the table ends 118 and 119, respectively, so that actuation of the switch 159 is accomplished by swinging either end of the table top 116 from its welding position below the welding heads 4 as will be described more completely hereinafter.

Referring now to Fig. 1, the table top 116 may be non-rotatably fixed relative to the vertical main frame 11 of the support 1 with either table end 118 or 119 positioned beneath the welding heads 4 by means of a table lock mechanism indicated by the reference character 161.

As best shown in Figs. 1, 9 and 10, the table lock mechanism 161 comprises a horizontal base plate 162 rigidly secured to the horizontal beam 17 of the vertical main frame 11. A block 163 is mounted on the plate 162 and slidably supports a lock rod 166 and a bumper bar 167 both of which are rigidly connected to a bracket 168. The lock rod 166 and bumper bar 167 are moved simultaneously in the block 163 by means of a pneumatic ram 169 mounted on the plate 162. The ram 169 is provided with a piston rod 171 connected to the bracket 168 by means of a pin 172.

A table block 173 is mounted on the table end 118 and an identical block 173 is mounted on the opposite table end 119. Each of the blocks 173 is provided with an aperture 174 to receive the lock rod 166 when the table end 118 or 119 is locked to the support 1. A bumper bolt 176 is slidably mounted in the block 173 in position to abut the bumper bar 167. Sliding movement of bumper bolt 176 is resisted by a spring 177 disposed between the head of the bolt 176 and the table block 173.

An electric switch 178 is mounted on the block 163 and a cam plate 179 is mounted on the table block 173 by means of studs 181 passing through an elongated slot 182 in the cam plate 179 and threadably engaged with the block 173. The switch 178 is provided with a roller 183 and the cam plate 179 is positioned to engage the roller 183 upon swinging movement of the table top 116. The cam plate 179 may be adjusted longitudinally of the slot 182 to determine the relative positions of the table top 116 and support structure 1 at the time of switch actuation by the cam 179. The switch 178 opens and closes a circuit to energize and deenergize a solenoid for controlling a valve in the air supply line to the air ram 169.

The position of the cam 179 and the switch 178 is such that the switch is actuated by the cam 179 a short time before the table reaches its locked position. As table top 116 swings from the dot-dash line position in Fig. 9 to the full line position, the switch 178 is actuated to close an electric circuit to a solenoid actuated valve in an air supply line to the ram 169. The ram 169 then extends to move the bumper bar 167 and the lock rod 166 in the block 163 until the rod 166 engages the side of the table block 173. Engagement of rod 166 with the table block 173 resists further extension of the ram 169. Continued swinging movement of the table top 116 engages bumper bolt 176 with the bumper bar 167 to resiliently resist overtravel of the table top 116 and to bring the lock rod 166 into alignment with the aperture 174 in the table block 173. Upon alignment of the rod 166 and aperture 174, the ram continues to extend so that lock rod 166 enters the aperture 174. The ram 169 remains extended during the welding operation thereby keeping the table top 116 locked relative to the supporting structure 1 until the ram 169 is collapsed by manually actuating the solenoid valve in the air supply line to close the latter. Collapse of the ram 169 makes it possible to swing the table top 116 away from under the welding heads 4 and to swing the opposite end of the table top into a locked position relative to support structure 1.

Referring now to Figs. 1 and 3, the complete welding operation may be started by properly locating workpieces at the stations 121 on the table end 118 and by completing an electric circuit to the magnets 127 to set up a magnetic field for securing the workpieces in their weld receiving position on the table top 116.

Weldments may be formed on the workpieces when the table end 118 is locked in position under the welding heads 4. Forming of the weldments begins by starting drive motor 69 and 76 thereby causing traverse 42 to reciprocate on the carrier 41 and causing carrier 41 to move to the right as viewed in Fig. 2. Upon movement of the carrier 41 the switches 87 are actuated as previously described to bring about depositing of flux on the workpieces, arcing between the ends of the welding rods 8 and the workpieces and feeding of welding rods 8 to the arcs. During movement of the carrier 41 and traverse 42 the welding heads 4 zigzag and form a weldment of predetermined width and length on each workpiece.

During application of the weldments, a welding machine operator has an opportunity to unload previously welded workpieces from the stations 121 on the opposite table end 119 and to thereafter load new workpieces on these stations. To unload welded workpieces, the operator deenergizes the magnets 127 so that the workpieces may be removed. After the workpieces have been removed, some unused flux will remain on the plate members 128 and jigs 133. The accumulation of flux must be removed before new pieces can be properly positioned in the jigs 133 and this is done by collapsing the air rams 134 so that the plate members 128 pivot downwardly toward the dot-dash line position shown in Fig. 7. This spills the unused flux from the jigs 133 and the rams 134 are then simultaneously extended to position the plate members 128 and jigs 133 in readiness to receive new workpieces. New workpieces are then loaded on the stations 121 and secured in position by the magnets 127.

After loading the table end 119 with new workpieces the operator waits, if necessary, for the carrier 41 to stop moving across the workpiece during the welding cycle. As the carrier 41 carries the welding heads 4 to the end of the weld, the cam members 88 actuate the control switches 87 and the rod feed motors 7 stop turning, the flux gates 63 close, the welding arc disappears and the carrier 41 stops moving. The operator then unlocks the table top 116 from the support 1 by retracting the air ram 169 and swings table end 118 in a clockwise direction as viewed in Fig. 3 from under the welding heads 4.

As swinging movement of the table end 118 begins, the cam 160 associated with table end 118 engages switch 159 to complete the electrical circuit to the motor 69 causing it to rotate and to return the carrier 41 to the position which it occupied at the beginning of the weld depositing cycle. During the time that the carrier 41 is returning to its original position, the operator continues to swing the table end 118 to position it for unloading and loading of workpieces and to position the opposite table end 119 beneath the welding heads 4. As the table end 119 moves under the welding heads 4, the cam 179 on the table lock mechanism 161 actuates the switch 178 to lock the table in position under the welding heads 4 as previously described.

The operator may then complete the electrical circuit to the drive motors 69 and 78 to begin the new welding cycle and during the course of welding he may unload the previously welded workpieces and load new workpieces at the stations 121.

During a complete cycle of operation, one person can operate the welding machine to form weldments of predetermined width and length simultaneously on a plurality of workpieces by loading four unwelded workpieces on table end 118, unlocking table end 119 and rotating it to position table end 118 under the welding heads 4, actuating the drive motors 69 and 76 and then unloading welded workpieces from the table end 119 during welding of the workpieces on table end 118.

The welding machine disclosed herein readily lends itself for use in simultaneously facing the surfaces of a plurality of workpieces with identical weldments of predetermined length and width. The machine is provided with a work holder or table top 116 for positioning the workpieces with their surfaces in the same generally horizontal plane and the welding heads 4 are moved in a plane parallel to and above the workpieces by a dual feed mechanism which furnishes conjoint cross feed and length feed movement to the welding heads 4 during formation of the weldment. Actuation of the dual feed mechanism automatically opens and closes the welding circuits and controls the supply of flux and weld metal to the welding zones on the workpieces.

It should be understood that it is not intended to limit the invention to the particular forms and details described herein and that the invention includes such other forms and modifications as are embraced by the scope of the appended claims.

It is claimed and desired to secure by Letters Patent:

1. An arc welding machine for simultaneously facing a plurality of workpieces with weldments of predetermined length and width, said machine comprising a support; a work holder cooperable with said support and workpieces to secure the latter side by side in a horizontal plane and in fixed relation to said support; a carrier mounted on said support for horizontal straight line movement relative thereto; a traverse mounted on said carrier for straight line movement relative thereto in right angle relation to said straight line movement of said carrier; a plurality of welding heads corresponding in number to the number of said workpieces, said welding heads secured to said carrier for movement therewith; drive means operatively interposed between said support and carrier for effecting said straight line movement of both said carrier and said traverse and thereby imparting length feed movement to said welding heads; and auxiliary drive means operatively interposed between said carrier and said traverse for effecting straight line movement of said traverse relative to said carrier thereby imparting cross feed movement to said welding heads, said work holder comprising a rotary table having a radial series of workpiece mounting stations corresponding in number to the number of said workpieces, and another radial series of workpiece mounting stations corresponding in number to the number of said workpieces and in circumferentially displaced relation to said first mentioned series of workpiece mounting stations.

2. An arc welding machine as set forth in claim 1 in which said rotary table includes a cam mounted on the outer periphery of each said radial series of workpiece mounting stations and said support includes a stop means cooperable with said cams for selectively positioning and securing either of said radial series of workpiece mounting stations in underlying relation to said welding heads.

3. An arc welding machine for simultaneously facing a plurality of workpieces with weldments of predetermined length and width, said machine comprising a support; a work holder cooperable with said support and workpieces to secure the latter side by side in a horizontal plane and in fixed relation to said support; a carrier mounted on said support for horizontal straight line movement relative thereto; a traverse mounted on said carrier for straight line movement relative thereto in right angle relation to said straight line movement of said carrier; a plurality of welding heads corresponding in number to the number of said workpieces, said welding heads secured to said carrier for movement therewith; drive means operatively interposed between said support and carrier for effecting said straight line movement of both said carrier and said traverse and thereby imparting length feed movement to said welding heads; and auxiliary drive means comprising a crank element rotatably mounted on said carrier, a pitman operatively connecting said crank element with said traverse, and a motor mounted on said carrier and connected in driving relation with said crank element, said auxiliary drive means effecting straight line movement of said traverse relative to said carrier thereby imparting cross feed movement to said welding heads, said work holder comprising a rotary table having a radial series of workpiece mounting stations corresponding in number to the number of said workpieces, and another radial series of workpiece mounting stations corresponding in number to the number of said workpieces and in circumferentially displaced relation to said first mentioned series of workpiece mounting stations.

References Cited in the file of this patent

UNITED STATES PATENTS

| | | |
|---|---|---|
| 1,241,094 | Conard | Sept. 25, 1917 |
| 1,947,300 | Mayoh | Feb. 13, 1934 |
| 2,162,133 | Spire | June 13, 1939 |
| 2,191,476 | Hopkins | Feb. 27, 1940 |
| 2,191,481 | Hopkins | Feb. 27, 1940 |
| 2,367,257 | Baird | Jan. 16, 1945 |
| 2,390,596 | Larsen | Dec. 11, 1945 |
| 2,423,190 | Kennedy | July 1, 1947 |
| 2,472,803 | Beyer | June 14, 1949 |
| 2,510,123 | Marshall | June 6, 1950 |
| 2,525,133 | Hopkins | Oct. 10, 1950 |
| 2,550,641 | Harter | Apr. 24, 1951 |
| 2,591,809 | Hanson | Apr. 8, 1952 |
| 2,604,249 | Gorham | July 22, 1952 |
| 2,683,432 | Schanz | July 13, 1954 |
| 2,684,426 | Carpenter | July 20, 1954 |
| 2,696,547 | Felton | Dec. 7, 1954 |